United States Patent [19]

Kakuta et al.

[11] Patent Number: 4,619,879
[45] Date of Patent: Oct. 28, 1986

[54] COMPOSITE TYPE PHOTOSENSITIVE MEMBER HAVING METAL-FREE PHTHALOCYANINE IN THE CHARGE GENERATING LAYER AND NONIONIC DYE BASE IN THE CHARGE TRANSPORT LAYER

[75] Inventors: Atsushi Kakuta, Hitachiohta; Hiroyuki Oka, Hitachi; Shigeo Suzuki, Hitachi; Kotaro Araya, Hitachi; Yasuki Mori, Hitachi; Hirosada Morishita, Hitachi, all of Japan

[73] Assignee: Hitachi, Ltd., Tokyo, Japan

[21] Appl. No.: 695,575

[22] Filed: Jan. 28, 1985

Related U.S. Application Data

[63] Continuation of Ser. No. 486,821, Apr. 20, 1983, abandoned.

[30] Foreign Application Priority Data

Apr. 20, 1982 [JP] Japan .................................. 57/66964

[51] Int. Cl.$^4$ .............................................. G03G 5/10
[52] U.S. Cl. .......................................... 430/58; 430/76
[58] Field of Search .............................. 430/56, 58, 76

[56] References Cited

U.S. PATENT DOCUMENTS 4,450,218  5/1984  Takei et al. ........................... 430/59
4,507,374  3/1985  Kakuta et al. ........................ 430/56

Primary Examiner—John L. Goodrow
Attorney, Agent, or Firm—Antonelli, Terry & Wands

[57] ABSTRACT

The disclosure is concerned with a photoconductive member useful for electrophotography wherein a charge generating layer containing a new metal-free phthalocyanine and a charge transport layer containing a nonionic compound of styrylic or oxazol dye base. The photosensitive member exhibits a high sensitivity to light having a long wavelength and therefore, it is properly used as photosensitive member for printers using semiconductor lasers.

37 Claims, 2 Drawing Figures

COMPOSITE TYPE PHOTOSENSITIVE MEMBER HAVING METAL-FREE PHTHALOCYANINE IN THE CHARGE GENERATING LAYER AND NONIONIC DYE BASE IN THE CHARGE TRANSPORT LAYER

This is a continuation of application Ser. No. 486,821, filed Apr. 20, 1983, now abandoned.

BACKGROUND OF THE INVENTION

The present invention relates to a photosensitive member useful for electrophotography, and more particularly to a composite type photosensitive member for electrophotography which has a high sensitivity even to light having a long wavelength.

A large number of organic substances have been proposed in the past as a charge generating material for a composite type photosensitive member comprising a charge generating layer formed on an electroconductive substrate and a charge transport layer formed on or beneath the charge generating layer. Examples of such known substances include monoazo dyes, diazo dyes, and squaric acid derivatives that are soluble in organic primary amines and are disclosed in Japanese Patent Laid-Open No. 55643/1977, quinocyanine pigments that are disclosed in Japanese Patent Laid-Open Nos. 42380/1978 and 41230/1978, copper phthalocyanine pigments that are disclosed in Japanese Patent Laid-Open No. 11763/1976, and so forth. Inorganic substances such as Te-As-Se have also been known.

On the other hand, various charge transport substances have been also proposed. Examples include polyvinylcarbazoles, pyrazoline derivatives, trinitrofluorenone, various nitro- and cyano-substituted compounds, and so forth.

The photosensitive member for electrophotography using these charge generating and transport materials showed good electrophotographic properties but still have some defects such as no or little sensitivity to the near-infrared light (having a wavelength of 750 nm or longer). Though the known materials are highly sensitive to the light in visible range of from 400 to 700 nm, they are not effective as a photosensitive member for the near-infrared light emitted from a semiconductor laser.

In the past few years, there have been proposed high speed laser beam printers in which semiconductor lasers are used as a light source. The semiconductor lasers can generally emit the near-infrared light. Hence, the development of photosensitive members which have a high sensitivity to a long wavelength light, especially to the near-infrared light, is desired.

By employing the semiconductor laser as a light source, the size of the printer itself can be reduced and a power consumption can also be reduced.

The charge generating substance must have such a property that it forms an electron-hole pair by the light passing through the charge transport layer and implants the resulting hole (or electron) into the charge transport layer by an electric field. On the other hand, the charge transport substance must have such properties that a light carrier generated in the charge generating layer by illumination of light can be injected effectively to the charge transport substance and it has a suitable light absorption range that does not impede the wavelength of light absorbed by the charge generating layer.

A distinct correlation exists between the effective injection of the light carrier and the ionization potential of the charge transport layer. The result of researches has already been reported that in the case in which an electron is the carrier, for example, the electron affinity of the charge transport layer must be higher than that of the charge generating layer and the ionization potential must be lower when a positive hole is the carrier.

On the other hand, a sensitive wavelength range as the photosensitive member depends upon an absorption wavelength range of the charge generating layer unless the charge transport layer to be used interferes with the light absorbed by the charge generating layer. Although various kinds of organic photoconductors are known, their sensitivity is generally limited to the visible range of up to 700 nm.

SUMMARY OF THE INVENTION

It is an object of the present invention to provide a composite type photosensitive member for electrophotography which has a high sensitivity to the light in a wide range of wavelength (500 to 825 nm). The member is also featured by a particularly high sensitivity to the emitting light of the semiconductor laser.

The photosensitive member of the present invention is featured in that a charge generating layer containing an effective amount of $\tau$, $\tau'$, $\eta$ and/or $\eta'$ form metal-free phthalocyanine is formed on an electroconductive substrate, and a charge transport layer containing an effective amount of styrylic and/or oxazole compound is formed on the charge generating layer.

DETAILED DESCRIPTION OF THE INVENTION

The metal-free phthalocyanines used in the present invention have characteristics of X-ray diffraction patterns shown in Table 1 below. Table 1 shows Bragg angles of strong peaks of the phthalocyanines. The phthalocyanines are used singly or in combination. As $\eta'$ form phthalocyanine, there are two kinds, one of which is shown in Table 1 and the other exhibits strong peaks at Bragg angles of 22.1 and 28.5 in addition to the peaks of $\eta'$ form shown in Table 1.

The $\eta$ form or $\eta'$ form metal-free phthalocyanine is a mixed material consisting of 100 parts by weight of metal-free phthalocyanine and up to 50 parts by weight of at least one member selected from the group consisting of metal-free phthalocyanine having substituents for benzene nuclei, a porphine type compound which may have a substituent on its benzene nucleus, and a metal-containing phthalocyanine.

The $\tau$ and $\tau'$ metal-free phthalocyanines have four absorption bands, the strongest of which is at $751\pm2$ $cm^{-1}$ and $753\pm2$ $cm^{-1}$ between 700 and 760 $cm^{-1}$, respectively; two absorption bands being substantially the same strength between 1320 and 1340 $cm^{-1}$; and a characteristic absorption at $3288\pm3$ $cm^{-1}$ and $3297\pm3$ $cm^{-1}$.

The $\eta$ and two types of $\eta'$ form metal-free phthalocyanines have such infrared absorption spectrum that the strongest bands in four absorption bands is at $753\pm10$ cm between 700 and 760 cm, the two absorption bands of substantially the same strength between 1320 and 1340 and a characteristic absorption at $3285\pm5$ cm and $3297\pm5$ cm, respectively.

Incidentally, X-ray diffraction and infrared spectrum have some allowances depending upon the production and conditions and upon the lattice defect or the mode of transformation inside the crystal. The Bragg angle $2\theta$ is measured by a power X-ray diffractometer using 1541 Å of CuKa/Ni.

The maximum values of the sensitive wavelength range of both $\tau$ form and $\eta$ form metal-free phthalocyanines fall within the range of 790 to 810 nm.

When the X-ray diffraction angle of the $\tau$ form metal-free phthalocyanine is compared with that of other crystal types, there is a clear distinction between it and the $\alpha$ form and the $\beta$ form and the diffraction pattern is entirely different from the X form, which is relatively analogous to the former, at a high Bragg angle of at least 20.0. In the $\tau$ form, clear diffraction lines appear near 20.4 and 20.9 but no line at all appears at 22.1 which can be observed in the X form. On the other hand, diffraction lines can not be observed at 20.3 and 20.8 in the X form. On the other hand, the $\tau$ form has a strong and sharp diffraction pattern comparable to that of the $\beta$ form and is found to have a stable and good crystallinity which far exceeds the $\alpha$, $\gamma$ and X forms having a poor crystallinity.

The $\tau$ form metal-free phthalocyanine can be clearly distinguished from other crystal forms by the measurement of the infrared absorption spectrum.

As described above, two types exist for the $\eta$ form metal-free phthalocyanine. This is because the two types having the same infrared absorption spectrum but having different X-ray diffraction patterns whose Bragg angles change at a high angle portion are obtained depending upon the production conditions. Since the infrared absorption spectra are the same, the difference is believed to result from the direction of growth of the crystal planes and both types can be regarded as the $\eta$ form.

When the X-ray diffraction pattern angle of the $\eta$ form metal-free phthalocyanine is compared with those of other crystal types, it has a clear distinction from the $\alpha$ form and the $\beta$ form, and its diffraction pattern and shape are entirely different from those of the X form, which is relatively analogous to the former, at a high Bragg angle of at least 20.0. Clear diffraction lines appear in the $\eta$ form near 28.5 or 2.5 and 27.5 but no diffraction line appears at all at 22.1 at which the line appears in the X form. On the other hand, the diffraction lines of 28.5 or 21.5 and 27.5 do not appear in the X form. A strong and sharp diffraction pattern comparable to that of the $\beta$ form is obtained in the $\eta$ form. It can be thus understood that the $\eta$ form has a good and stable crystallinity which far exceeds the poor crystallinity of the $\alpha$, $\gamma$ and X forms.

Table 1 comparatively illustrates the infrared absorption spectra of the metal-free phthalocyanines of various crystal forms. The spectra of the $\alpha$, $\beta$ and X forms are cited from J. H. Sharp and M. Lardon's "Spectroscopic Characterization of New Polymorph of Metal-Free Phthalocyanine", J. Phys. Chem., Vol. 27, 3230 (1968). The spectra of the $\alpha$ and $\beta$ forms metal-free phthalocyanines are those obtained by the actual measurement.

In Table 1, the unit of figures is $cm^{-1}$ and the strength of absorption is expressed by symbols w(weak), m(medium) and s(strong) with sh representing shoulder.

As can be seen clearly from Table 1, the number of absorption waves of the $\tau$ form or $\eta$ form metal-free phthalocyanine in the range of 700 to 800 $cm^{-1}$ is different from those of the $\alpha$, $\beta$ and X forms and is remarkably different from the X form in the number of absorption waves near 3300 $cm^{-1}$ though they are analogous in the X-ray diffraction pattern.

TABLE 1

| $\alpha$ form | $\beta$ form | X form | $\tau$ form | $\tau'$ form | $\eta$ form | $\eta'$ form |
| --- | --- | --- | --- | --- | --- | --- |
| 714 (s-m) | | | 717 ± 1 (s) | 718 (s) | 718 ± 1 (s) | 718 ± 1 (s) |
| | | 720 (s) | | | | |
| | 724 (s) | | 730 ± 1 (s-m) | 731 (s-m) | 731 ± 1 (s-m) | 731 ± 1 (s-m) |
| 733 (s) | 733 (s-m) | 734 (s-m) | 736 ± 1 (s-m) | 737 (s-m) | 736 ± 1 (s-m) | 737 ± 1 (s-m) |
| 738 (s) | 739 (s-m) | 739 (s-m) | | | | |
| 743sh (m) | | | | | | |
| | 755 (s) | 755 (s) | 752 ± 1 (s) | 753 (s) | 753 ± 1 (s) | 753 ± 1 (m) |
| 767 (w-m) | | | 769 ± 1 (m-w) | 771 ± 1 (m) | 769 ± 1 (m-w) | 771 ± 2 (m-w) |
| | 772 (s) | 772 (s) | | | | |
| | 782 (m) | 784 (w) | 783 ± 1 (w) | 784sh (w) | 784 ± 1 (w) | 784 ± 1sh (w) |
| | | 1318 (s) | | | | |
| 1321 (s) | 1323 (s) | | | 1322 (s) | 1321 ± 1 (s) | 1322 ± 1 (s) |
| | | 1330 (s) | | 1335 (s) | | |
| 1336 (s) | 1334 (s) | | | | 1334 ± 1 (s) | 1335 ± 1 (s) |
| 3302 (w) | 3284 (m) | 3302 (w-m) | 3288 ± 5 (m) | 3297 ± 3 (m) | 3285 ± 5 (m) | 3297 ± 5 (m) |

The $\alpha$ form phthalocyanine, the metal-free phthalocyanine having a substituent on the benzene nucleus, the phthalocyanine nitrogen analog which may have a substituent on the benzene nucleus and metal-containing phthalocyanine as the starting materials for the $\tau$, $\tau'$, $\eta$ or $\eta'$ form metal-containing phthalocyanine are those which are produced by conventional methods such as a method of Moser and Thomas (Moser and Thomas: "Phthalocyanine Compounds") or other suitable methods. The metal-free phthalocyanine, for example, can be produced by treating those metal-containing phthalocyanines whose metal can be removed by treatment with an acid such as sulfuric acid. Examples of such metal-containing phthalocyanines are lithium phthalocyanine, sodium phthalocyanine, calcium phthalocyanine, magnesium phthalocyanine, and the like. The metal-free phthalocyanine can also be produced directly from phthalodinitrile, aminoiminoisoindolenine and alkoxyiminoisoindolenine. The metal-free phthalocyanine thus produced in accordance with the conventional methods is dissolved in sulfuric acid at a temperature preferably below 5° C. or converted into the sulfate and then poured into water or iced water for reprecipitation or hydrolysis, thereby providing the α-form metal-free phthalocyanine. The resulting α-form metal-free phthalocyanine is preferably used in the dry form but a water paste type may also be used.

Examples of the phthalocyanine derivative or porphine type compounds are various porphines as typified by copper tetrapyridinoporphyrazine in which at least one benzene nucleus of phthalocyanine is replaced by a quinoline nucleus. Examples of metal-containing phthalocyanine are phthalocyanines containing copper, nickel, cobalt, zinc, tin, aluminum, or the like. Examples of the substituent includes an amino group, a nitro group, an alkyl group, an alkoxy group, a cyano group, a mercapto group, a halogen atom, and the like. Furthermore, sulfonic acid residue, carboxylic acid residue and their metal salts, ammonium salts, amine salts and the like can also be mentioned as relatively simple examples. Various substituents can be introduced into the benzene nucleus (nuclei) via an alkylene group, a sulfonyl group, a carbonyl group, an imino group, and the like. Examples of such groups are known as an aggregation inhibitor or a crystal conversion inhibitor in the field of phthalocyanine pigments (e.g. U.S. Pat. Nos. 3,977,391 and 4,088,507). The method of introducing such a substituent, which is known in the art, is omitted and the one which is not known will be described in examples below as referential examples.

The mixing ratio of the α form metal-free phthalocyanine with a non-metallic phthalocyanine having a substituent on the benzene nucleus, the phthalocyanine nitrogen analog which may have a substituent on the benzene nucleus or metal-containing phthalocyanine may be at least 100/50 (weight ratio) and is preferably from 100/30 to 100/0.1 (weight ratio). If the ratio is above this range, the resulting η form phthalocyanine is likely to bleed and the suitable properties as the pigment would drop.

The components may be merely mixed at the mixing ratio described above or they may be mixed before the α form metal-containing phthalocyanine is acid-pasted. Conventional techniques for dispersing pigments or mixing emulsifiers may be used for stirring or milling the mixture thus prepared. Those dispersion media which are used for dispersing ordinary pigments or mixing ordinary emulsifiers may be used as the dispersion media for stirring and kneading in the present invention. Examples of such media include glass beads, steel beads, alumina balls, flint, and so forth. The dispersion media are not always necessary. Milling aids used for ordinary pigments can also be used in the present invention. Examples of the aids are sodium chloride sodium hydrogen-carbonate, sodium sulfate, and the like. The milling aid is not always necessary.

When the dispersion medium is necessary in stirring, kneading and milling, it is preferably a liquid at the stirring and kneading temperatures. At least one dispersion medium is selected from an alcohol type solvent such as glycerol, a glycol type solvent such as ethylene glycol, diethylene glycol or polyethylene glycol, a cellosolve type solvent such as ethylene glycol monomethyl ether or ethylene glycol monoethyl ether, a ketone type solvent, an ester ketone type solvent, and the like.

Typical equipment used in the crystal transformation process will be illustrated. General stirring devices are homomixer, disperser, agitator, stirrer, kneader, Banbury mixer, ball mill, sand mill, attritor, and the like.

The range of temperature in the crystal transformation process is from 30° to 220° C. and is especially from 50° to 180° C. for the τ form and preferably from 60° to 130° C. In the case of the η form, change to the β form is likely to occur if the temperature is higher than 220° C. and the transformation time to the η form becomes longer at a lower temperature. In the same way as in the ordinary crystal transformation process, crystallization seeds can be effectively used.

The crystal transformation speed to the τ form or η form greatly depends upon the stirring efficiency, mechanical strength, the size of the starting particles and temperature.

After the crystal transformation process is completed, the aid, the organic solvent and the like are removed by an ordinary purification method and when the residue is merely dried, a pigment having large and clear tinting strength and excellent heat resistance as well as solvent resistance can be obtained. Ordinary surface treatment can be added by use of surfactants, resins, and the like.

Moreover, the heat and solvent resistances can be unexpectedly improved. In other words, the crystal form of the τ, τ', η or η' form metal-free phthalocyanine is stable to the solvents that are generally used, and can be used for a wide variety of applications. For example, the crystal form of the τ form metal-free phthalocyanine does not change even when boiled at the boiling point of each of acetone, tetrahydrofuran and ethyl acetate for more than three hours. It is extremely stable also to an aromatic type solvent which easily converts the α form phthalocyanine which is unstable to the solvent into the β form. When the τ form metal-free phthalocyanine is boiled at 100° C. for more than 3 hours in toluene, for example, no transformation of the crystal can be observed. It has excellent heat resistance. Hence, no transformation of the crystal can be observed even when the τ or τ' form is left standing at 150° C. for more than 50 hours in the air and when the η and η' form is left standing at 200° C. for more than 50 hours in the air. Especially in the case of the η or η' form, delicate adjustment of hue can be made depending upon the kinds and amounts of various derivatives that are used in combination with the metal-free phthalocyanine.

The present invention embraces within its scope not only the use of the τ, τ', η and η' form metal-free phthalocyanines but also the use of the τ, τ', η and/or η' form metal-free phthalocyanines in combination with other charge generating substances. Examples of such charge generating substances include the α form, β form, γ form and X form metal-free phatalocyanine. It is of course effective to use the τ form metal-free phthalocyanine in combination with the τ', η or η' form one. It is also effective to use the phthalocyanine with other phthalocyanine pigments that are known as the charge generating substance, azo pigments, anthraquinone pigments, indigoid pigments, quinacriidone pigments, perylene pigments, polycyclic quinone pigments, methyl squarate pigments, and the like.

The present invention uses a styryl type pigment as the charge transport substance but other charge transport materials may also be used in combination.

The composite type photosensitive member for electrophotography of the present invention is preferably produced by forming a layer containing the τ, τ', η and/or η' form metal free phthalocyanine as the charge generating substance on a conductive substrate and then disposing a layer containing a nonionic styryl and/or oxazole dye base as transport substance.

The nonionic styryl and oxazole dye bases are represented by the following formula:

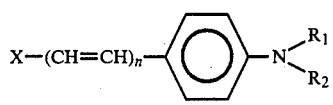

where X represents a heterocyclic group selected from the group consisting of

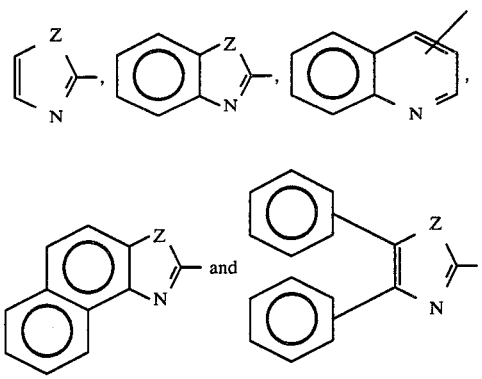

(where Z represents O or S, the heterocyclic group may be substituted, n is 0, 1 or 2 and each of $R_1$ and $R_2$ represents an alkyl group of up to three carbon atoms).

The following are examples of substituents for the heterocyclic group: lower alkyl groups such as —$CH_3$, —$C_2H_5$ and —$C_3H_7$; halogen groups such as —Cl, —Br and the like; dialkylamino groups such as —$N(CH_3)_2$, —$N(C_2H_5)_2$, —$N(C_3H_7)_2$ and the like; alkoxy groups such as —$OCH_3$, —$OC_2H_5$ and the like; and a phenyl group.

The structural formulas of some of nonionic styryl and oxazole dye bases are illustrated below:

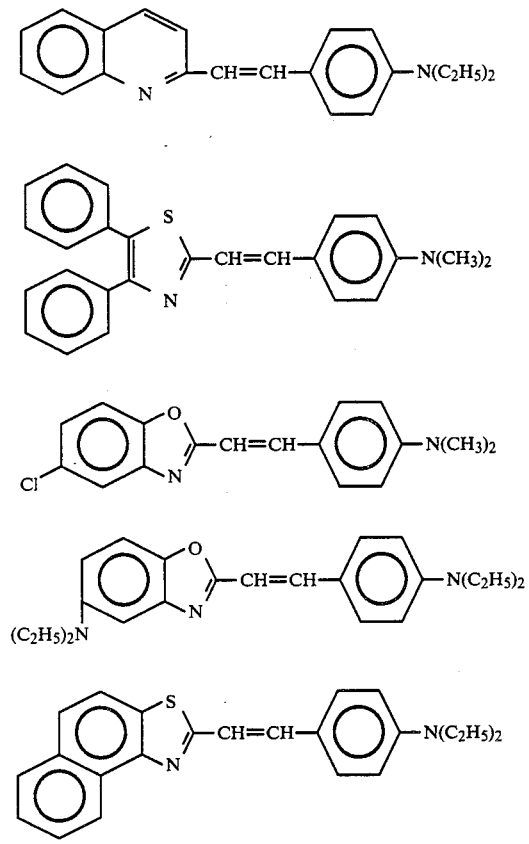

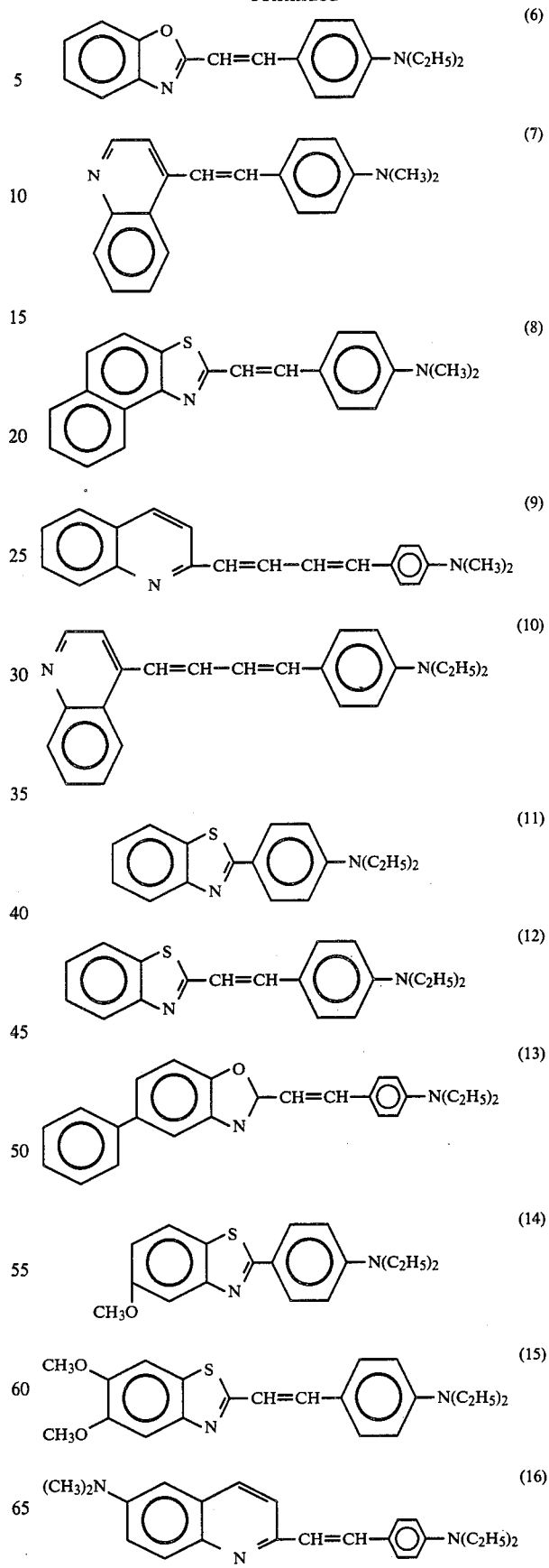

(17) 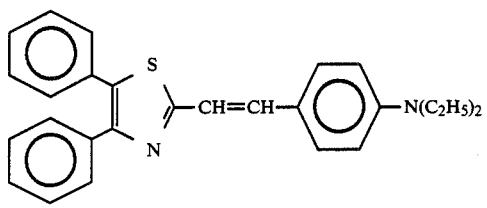

(18) 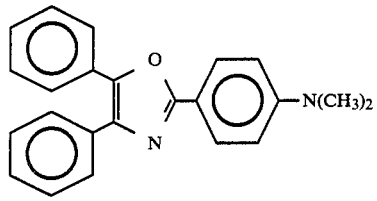

(19) 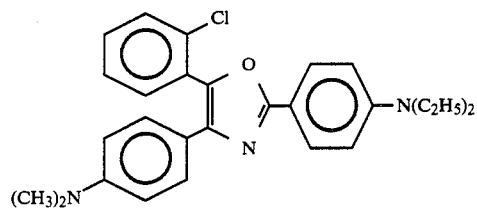

(20) 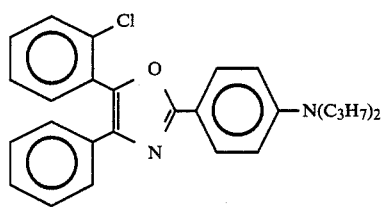

(21) 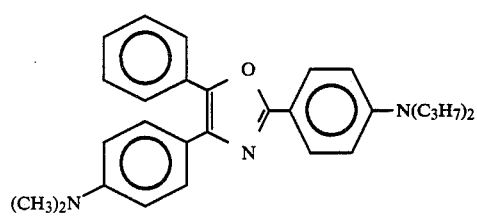

(22) 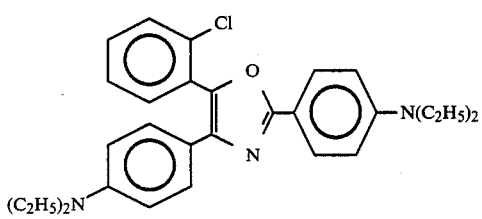

(23) 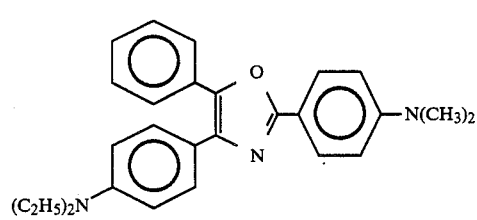

(24) 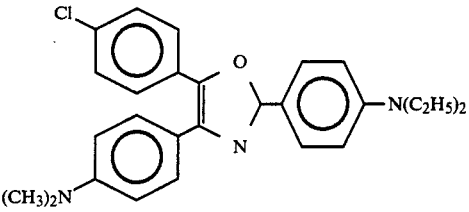

The methods of synthesizing these compounds are disclosed in Japanese Patent Publication No. 11218/1960 and Japanese Patent Publication No. 11219/1960.

Besides the styryl type or oxazol type dye bases, it is also possible to use, as the charge transport substance, photoconductive polymers having carbazole or anthracene rings in their side chains, such as poly-N-vinylcarbazole, poly-9-p-vinylphenylanthracene and the like, and polymers having other heterocyclic or aromatic rings such as pyrazoline or dibenzothiophene rings, in combination with the dye bases. Furthermore, a charge transport layer can also be formed by conjointly blending into a general-purpose resin the heretofore known photo-electric low-molecular weight compounds such as a cyanine pigment base, oxadiazole derivatives, pyrazoline derivatives, hydrazone type compounds, poly-N-vinylcarbazole, triphenylmethane compounds, triphenylamine type compounds, nitrofluorenones such as 2,4,7-trinitrofluorenone, and the like.

The photosensitive member for electrophotography in accordance with the present invention can be produced by, for example, forming the layer of the charge generating substance on the conductive substrate and then the layer of the charge transferring substance upon the former. The layer of the charge transport substance may be formed on the layer of the charge generating substance, on the contrary.

The layer of the charge generating substance can be prepared by finely milling the system of the $\tau$, $\tau'$, $\eta$ and/or $\eta'$ form metal-free phthalocyanine or its mixture with a binder resin or resins using a ball mill or a roll mill (to a particle size of up to 5 $\mu$m and especially, up to 1 $\mu$m), then dispersing and mixing the coating solution and depositing the coating solution. The thickness of the layer of the charge generating substance varies with the necessary sensitivity or with the mixing ratio of the $\tau$, $\tau'$, $\eta$ and $\eta'$ form metal-free phthalocyanine with the binder resin. It is generally up to 20 $\mu$m and preferably, from 0.1 to 3 $\mu$m. If the thickness is too great, not only the sensitivity is lowered but also the flexibility of the film is lowered so that the film is likely to peel. The mixing ratio of the $\tau$, $\tau'$, $\eta$ and/or $\eta'$ form metal-free phthalocyanine to the binder resin is up to 4 parts by weight of the latter to one part by weight of the former. If the ratio is higher than this range, the sensitivity tends to gradually decrease.

The layer of the charge transport substance is also formd by coating. The binder resin is essentially necessary so that the layer of the charge transport substance has mechanical strength as the film. A coating solution is prepared by use of an organic solvent capable of dissolving both the charge transport substance and the binder resin. The thickness of the layer of the charge transport substance is determined in accordance with the charge characteristics necessary for the photosensitive member. It is generally from 5 to 100 $\mu$m and preferably, from 8 to 30 μm. A suitable range of the mixing ratio of the charge transport substance and the binder resin is 0.5 to 4 parts by weight of the latter to one part by weight of the former.

The binder resin used for both charge generating and transport substances is a heretofore known binder for electrophotography. Examples of such a binder resin are a phenol resin, a urea resin, a melamine resin, a furan resin, an epoxy resin, a silicone resin, a vinylchloride vinylacetate copolymer, a xylene resin, a urethane resin, a vinylacetate-methacrylic copolymer, an acrylic resin, a polycarbonate resin, a polyester resin, cellulose derivatives, and so forth. Furthermore, photoconductive polymers having carbazole or anthracene rings in their side clains, such as poly-N-vinylcarbazole, poly-9-(p-vinylphenyl)-anthracene and the like, and polymers having other heterocyclic or aromatic rings, such as pyrazoline or dibenzothiophene rings, in their side chains can be used as the binder resin. Incidentally, these photoconductive polymers can be used also as the charge transport substance.

The mixing ratio of the $\tau$, $\tau'$, $\eta$ or $\eta$ form metal-free phthalocyanine and the binder resin is suitably 20 to 200 parts by weight of the phthalocyanine per 100 parts by weight of the resin. If other sensitizers or charge transport materials are present together, the amount of the phthalocyanine can be reduced down to about 1 part by weight. Below 1 part by weight, however, the characterizing feature of the metal-free phthalocyanine does not appear in sensitivity or in the sensitive wavelength range. On the other hand, if the amount exceeds 200 parts by weight, the mechanical strength and the charge retaining property at dark necessary for the photosensitive member can not be secured sufficiently. The thickness of the mixed layer containing the $\tau$ form metal-free phthalocyanine is suitably from 5 to 50 μm.

The sensitivity of the photosensitive member for electrophotography in accordance with one embodiment of the present invention is 4 to 5 lux.s (lux.second) in terms of the half decay exposure sensitivity (light energy necessary for reducing the surface potential to a half) to white light. The photosensitive member exhibited an extremely high sensitivity of up to 20 mJ/m$^2$ in terms of the half decay exposure with respect to 800 nm monochromatic light.

Whenever necessary, surfactants and plasticizers can be added to the layers of the charge generating substance and the charge transport substance to improve mechanical properties such as bondability and abrasion resistance, physical properties such as film formability and flexibility, and electrophotographic properties through the improvement in dispersibility of the starting materials.

Examples of the conductive substrate are brass, aluminum, gold, copper and the like. The substrate may be a sheet, thin plate or drum having a suitable thickness, and hardness. It may be coated with a thin plastic layer or glass coated with a metal coating, a metal-plastic sheet, aluminum iodide, copper iodide, indium oxide or tin oxide. Generally, the substrate itself is preferably conductive or has a conductive surface and is sufficiently strong to handle.

The composite type photosensitive member for electrophotography in accordance with the present invention exhibits a high sensitivity especially when charged negative. Its particularly remarkable feature resides in the sensitive wavelength range and it exhibits a peak of sensitivity especially in the range of 790 to 810 nm. This is the very reason why the photosensitive member of the present invention is particularly suitable for the semiconductor laser.

DESCRIPTION OF THE PREFERRED EMBODIMENTS

Figure 1:
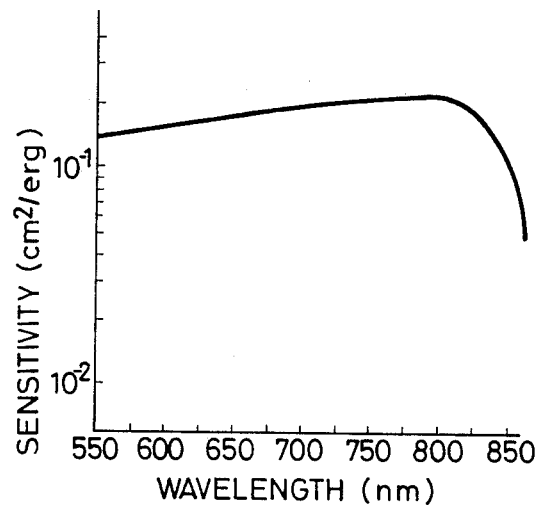
FIGS. 1 and 2 are spectral sensitivity characteristic diagrams of the composite type photosensitive members for electrophotography in accordance with the embodiments of the present invention using the $\tau$, $\tau'$, $\eta$ and $\eta'$ form metal-free phthalocyanines as the charge generating substance, respectively.

Hereinafter, the present invention will be described more definitely with reference to examples thereof.

EXAMPLE 1

10 parts by weight of purified α form metal-free phthalocyanine, 20 parts by weight of sodium chloride as an aid and 8 parts by weight of polyethylene glycol as a solvent were placed in a kneader and the mixture was milled at 60° to 120° C. for 8 hours. After conversion to the $\tau$ form was confirmed by X-ray diffraction, the mixture was withdrawn from the kneader and the aid and the solvent were removed by water and methanol. Then, the residue was purified by a 2% diluted aqueous sulfuric acid solution, filtered, washed with water and then dried, thereby providing a distinct and greenish blue pigment. This crystal was found to be $\tau$ form metal-free phthalocyanine by X-ray diffraction pattern and infrared spectrum.

Next, 1 part by weight of this $\tau$ form metal-free phthalocyanine and 1 part by weight of a butyral resin (XYHL, a product of Union Carbide Corp. Ltd.) were prepared in a 6 wt% solution using xylene as the solvent and the mixed solution was kneaded for 5 hours using a ball mill (3-inch pot, a product of Nippon Kagaku Kogyo K.K.) to obtain a coating solution of a charge generating substance. This coating solution was applied on a 100 μm-thick aluminum foil using an automatic applicator (a product of Toyoseiki Seisakusho Co., Ltd.) and was then dried to form a charge generating layer of 3 μm thick.

Then, a coating solution was prepared using 1.5 parts by weight of a compound No. 6 (NK-1347, a product of Japanese Research Institute for Photosensitizing Dyes Co., Ltd., hereinafter referred to as Photosensitizing Dyes), 1 part by weight of a polycarbonate resin (Iupilon S-3000, a product of Mitsubishi Gas Kagaku K.K.), 10 parts by weight of dichloromethane as the solvent and 3 parts by weight of 1,2-dichloroethane as the solvent. This coating solution was applied on the layer of the charge generating substance described above using the automatic applicator, forming a charge transport layer of 13 μm thick.

The electrophotographic properties of the composite type photosensitive member for electrophotography produced in this example were evaluated using an electrostatic recording paper tester (SP-428, a product of Kawaguchi Electric Works, Ltd.). In this case, charging was effected for 10 seconds by generating corona discharge of −5 kV [the surface potential $V_o$ (V) immediately after charging for 10 seconds was taken as the initial potential]. After the photosensitive member was left standing at dark for 30 seconds [the potential at this time was expressed by $V_{30}$ (V) and ($V_{30}/V_o \times 100(\%)$) was taken as dark decay], it was exposed to a tungsten lamp so that the illumination of the surface became 2 lux. The decay and time of the surface potential at this time were recorded and the white light sensitivity [half decay exposure, $E_{50}$ (lux.second)] was expressed by the product of the time t (second) required to reduce the surface potential to a half of $V_{30}$ and the illumination. The spectral sensitivity (cm$^2$/erg) was expressed by the reciprocal of $E_{50}$ which was the product of the time t (second) and the energy $\mu W/cm^2$) at each wavelength by using a monochromatic light from the tungsten lamp.

As a result, the photosensitive member of this example was found to possess an initial potential of 850 V, a dark decay of 74%, and a white light sensitivity of as high as 0.8 lux.sec. The spectral sensitivity was further examined. The result is shown in FIG. 1. As can be clearly seen from this diagram, the photosensitive member had a high sensitivity from the visible range to the long wavelength range. Conventionally, no photosensitive member providing a high sensitivity in the range of at least 800 nm has been available. It could thus be found that the photosensitive member of this example could be utilized as a photosensitive member for a duplicating machine using white light as the light source and for a laser beam printer using a semiconductor laser as the light source.

EXAMPLE 2

100 parts by weight of purified α form metal-free phthalocyanine, 10 parts of a phthalocyanine derivative listed below, 200 parts by weight of milled sodium chloride and 80 parts by weight of polyethylene glycol were placed in a kneader and the mixture was milled at 60° to 130° C. for 8 hours. After discharging the mixture from the kneader, the mixture was purified by a 2% aqueous sulfuric acid solution, filtered, washed with water and then dried, providing η form metal-free phthalocyanine:

Pc-(-CONH$_2$NHC$_2$H$_5$)$_{11}$ where Pc represents a phthalocyanine nucleus and the figure outside the parenthesis represents a mean substitution number by analysis.

Next, 1 part by weight of η form metal-free phthalocyanine and 1 part by weight of a butyral resin (XYHL, a product of Union Carbide Corp. Ltd.) were dissolved in xylene to form a 6 wt% solution. The solution was kneaded for 5 hours by a ball mill a jar of 91 mm diameter, a product of Nippon Kagakutogyo K. K.), to produce a coating solution of the charge generating substance. This solution was applied on a 100 μm-thick aluminium foil by an automatic applicator (a product of Toyo Seiki K. K.) and was dried to provide a charge generating layer of 3 μm thick.

Next, 1.5 parts by weight of a compound No. 6 (NK-1347, a product of Photosensitizing Dyes) and 1 part by weight of a polycarbonate resin (Iupilon S-3000, a product of Mitsubishi Gas Kagaku K. K.) were dissolved in 10 parts by weight of dichloromethane and 3 parts by weight of 1,2-dichloroethane, providing a coating solution. This solution was applied on the layer of the charge generating substance in the same manner as in Example 1 to form a the charge transport layer of 13 μm thick. The electrophotographic properties of the composite type photosensitive member were evaluated in the same manner as in Example 1.

Figure 2:
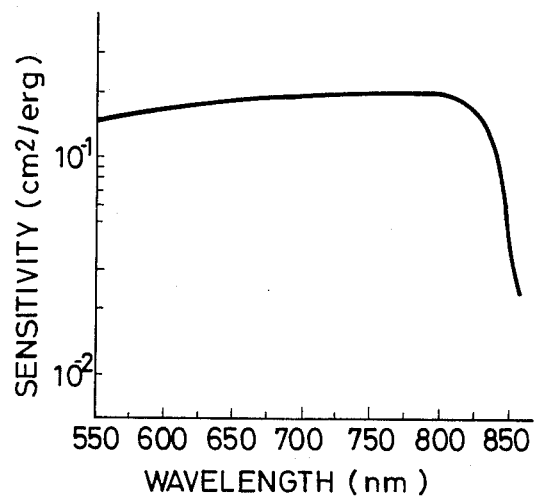

As a result, the photosensitive member of this example was found to possess an initial potential of 810 V, a dark decay of 68% and a white light sensitivity of as high as 1.0 lux.second. The spectral sensitivity was further examined. The result is shown in FIG. 2. As can be clearly seen from this diagram, the photosensitive member had a high sensitivity from the visible range to the long wavelength range.

EXAMPLE 3

0.1 part by weight of the τ form metal-free phthalocyanine obtained in Example 1 was added to each of 2, 4, 6, 8, 10 and 12 parts by weight of tetrahydrofuran and was sufficiently dispersed by ultrasonic wave. Thereafter, charge generating layers having different thickness were produced in the same way as in Example 1.

Next, each coating solution was prepared by dissolving 1 part by weight of a compound No. 20 and 1 part by weight of a saturated polyester resin (Vilon 200, a product of Toyo Boseki K. K.) in 10 parts by weight of tetrahydrofuran and each solution was applied in the same way as in Example 1, providing a composite type photosensitive member for electrophotography (thickness of the charge transport layer: 10 μm).

The electrophotographic properties of the photosensitive members were examined with the results shown in Table 2.

TABLE 2

| thickness of charge generating layer | electrophotographic properties | | | |
| --- | --- | --- | --- | --- |
| | $V_0$ (V) | $V_{30}/V_0$ (%) | white light sensitivity (lux · sec) | sensitivity at 800 nm (cm$^2$/erg) |
| 0.1 | 820 | 78 | 3.2 | 0.07 |
| 0.3 | 810 | 76 | 2.0 | 0.10 |
| 0.5 | 800 | 72 | 0.9 | 0.20 |
| 1 | 780 | 70 | 0.8 | 0.22 |
| 3 | 700 | 59 | 1.0 | 0.20 |
| 10 | 510 | 42 | 3.8 | 0.05 |

As can be appreciated from above, if the layer of the charge generating substance is too thin, the sensitivity decreases because the absorption of light is lowered. If the layer is too thick, on the other hand, the sensitivity also decreases because the residual potential increases (in this case, the potential does not become zero even when the light is sufficiently illuminated. It seems that a peak of the sensitivity is obtained for the layer of the charge generating substance of near 1 μm.

EXAMPLE 4

Composite type photosensitive members for electrophotography were produced in the same way as in Example 3 except that the η form metal-free phthalocyanine of Example 2 was replaced by 0.1 part by weight of τ' form metal-free phthalocyanine. The electrophotographic properties of these photosensitive members are shown in Table 3.

TABLE 3

| thickness of charge generating layer (μm) | electrophotographic properties | | | |
| --- | --- | --- | --- | --- |
| | $V_0$ (V) | $V_{30}/V_0$ (%) | white light sensitivity (lux · sec) | sensitivity at 800 nm (cm$^2$/erg) |
| 0.1 | 750 | 72 | 3.4 | 0.06 |
| 0.3 | 730 | 67 | 2.2 | 0.09 |
| 0.5 | 720 | 66 | 1.1 | 0.19 |
| 1 | 700 | 62 | 1.0 | 0.20 |
| 3 | 680 | 58 | 1.2 | 0.17 |
| 10 | 500 | 42 | 4.0 | 0.04 |

Peak of sensitivity of the layer of the charge generating substance is near 1 μm.

EXAMPLE 5

Each of 0, 0.5, 1, 2, 4 and 6 parts by weight of an acrylic resin (Elevasite, a product of E. I. duPont) was added to 1 part by weight of the τ form metal-free phthalocyanine of Example 1 and tetrahydrofuran was added to prepare a 2 wt% solution. Thus coating solutions of the charge generating substance were obtained. Each coating solution was applied in the same way as in Example 1 to provide a charge generating layer (each film being about 1 μm thick). Further, a charge transport layer was provided on each layer in the same way as in Example 2, providing a composite type photosensitive member for electrophotography. The electrophotographic properties of these photosensitive members were

TABLE 5

| amount of acrylate resin per part by weight of η form metal-free phthalocyanine (part by weight) | electrophotographic properties | | | |
|---|---|---|---|---|
| | $V_0$ (v) | $V_{30}/V_0$ (%) | white light sensitivity (lux · sec) | sensitivity at 800 nm (cm²/erg) |
| 0 | 710 | 64 | 1.0 | 0.22 |
| 0.5 | 720 | 63 | 1.1 | 0.19 |
| 1 | 740 | 64 | 1.1 | 0.19 |
| 2 | 730 | 65 | 1.8 | 0.14 |
| 4 | 750 | 66 | 3.2 | 0.07 |
| 6 | 740 | 68 | 4.8 | 0.04 |

EXAMPLE 7

Each of 0.2, 0.5, 1, 2, 4 and 6 parts by weight of the polyester resin of Example 3 was added to 1 part by weight of the compound No. 1 and tetrahydrofuran was added to each mixture to prepare a 10 wt% solution. Each of the coating solutions thus prepared was applied on the charge generating layer of Example 1, providing a composite type photosensitive member for electrophotography (the charge transport layer being about 10 μm thick). The properties of these photosensitive members are shown in Table 6.

TABLE 6

| amount of saturated polyester resin per part by weight of charge transport substance (part by weight) | electrophotographic properties | | | |
|---|---|---|---|---|
| | $V_0$ (V) | $V_{30}/V_0$ (%) | white light sensitivity (lux · sec) | sensitivity at 800 nm (cm²/erg) |
| 0.2 | 200 | 20 | 0.7 | 0.25 |
| 0.5 | 420 | 43 | 0.8 | 0.22 |
| 1 | 680 | 55 | 1.0 | 0.20 |
| 2 | 750 | 68 | 1.1 | 0.19 |
| 4 | 1100 | 85 | 2.0 | 0.10 |
| 6 | 1450 | 92 | 5.5 | 0.03 |

As can be appreciated from above, if the proportion of the binder resin becomes great, the initial potential and the dark decay are excellent but the sensitivity tends to decrease.

EXAMPLE 8

The photosensitivity members for electrophotography were produced in the same way as in Example 7 except that the charge generating layer of Example 2 was used in place of the layer of the charge generating substance of Example 1. The properties of these photosensitive members for electrophotography are shown below.

TABLE 7

| amount of saturated polyester resin per part by weight of charge transport substance (part by weight) | electrophotographic properties | | | |
|---|---|---|---|---|
| | $V_0$ (V) | $V_{30}/V_0$ (%) | white light sensitivity (lux · sec) | sensitivity at 800 nm (cm²/erg) |
| 0.2 | 200 | 18 | 0.8 | 0.25 |
| 0.5 | 410 | 38 | 0.9 | 0.23 |
| 1 | 600 | 53 | 1.1 | 0.19 |
| 2 | 720 | 64 | 1.2 | 0.17 |
| 4 | 960 | 83 | 2.2 | 0.10 |
| 6 | 1320 | 90 | 5.8 | 0.02 |

EXAMPLE 9

Amounts of addition of tetrahydrofuran to 1 part by weight of the compound No. 3 and 1 part by weight of the polyester resin of Example 3 were variously changed to provide coating solutions having various concentrations. Each of the coating solutions thus obtained was applied to the charge generating layer of Example 1, providing a composite type photosensitive member for electrophotography. The electrophotographic properties of these photosensitive members are shown in Table 8 below. It can be appreciated from Table 8 that as the layer becomes thicker, the initial potential becomes greater but gets into saturation at a central extent.

TABLE 8

| thickness of charge transport layer (μm) | electrophotographic properties | | | |
|---|---|---|---|---|
| | $V_0$ (V) | $V_{30}/V_0$ (%) | white light sensitivity (lux · sec) | sensitivity at 800 nm (cm²/erg) |
| 3 | 210 | 68 | 0.8 | 0.22 |
| 5 | 370 | 66 | 0.8 | 0.22 |
| 8 | 600 | 68 | 0.8 | 0.22 |
| 15 | 850 | 67 | 1.0 | 0.20 |
| 20 | 1100 | 69 | 1.4 | 0.16 |
| 30 | 1200 | 68 | 1.5 | 0.15 |
| 50 | 1250 | 68 | 2.5 | 0.07 |
| 70 | 1270 | 68 | 3.2 | 0.06 |

EXAMPLE 10

The photosensitive members for electrophotography were produced in the same way as in Example 9 except that the charge generating layer of Example 2 was used in place of the layer of the charge generating substance of Example 1. The electrophotographic properties of these photosensitive members are shown below.

TABLE 9

| thickness of charge transport layer (μm) | electrophotographic properties | | | |
|---|---|---|---|---|
| | $V_0$ (V) | $V_{30}/V_0$ (%) | white light sensitivity (lux · sec) | sensitivity at 800 nm (cm²/erg) |
| 3 | 210 | 64 | 1.0 | 0.20 |
| 5 | 350 | 61 | 1.0 | 0.20 |
| 8 | 560 | 63 | 1.0 | 0.20 |
| 15 | 820 | 60 | 1.2 | 0.17 |
| 20 | 1050 | 62 | 1.6 | 0.16 |
| 30 | 1200 | 63 | 1.8 | 0.14 |
| 50 | 1250 | 61 | 2.8 | 0.08 |
| 70 | 1280 | 63 | 3.4 | 0.06 |

EXAMPLE 11

0.5 parts by weight of the τ form metal-free phthalocyanine of Example 1 or η form metal-free phthalocyanine of Example 2 was added to a mixed solution consisting of 15 parts by weight of tetrahydrofuran and 10 parts by weight of toluene and was sufficiently dispersed by ultrasonic wave, providing a coating solution. The solution was applied to provide a charge generating layer (about 1 μm thick) of 1 parts by weight of the compounds as the charge transport substance shown in Table 5 and 1 part by weight of the acrylate resin of Example 3 were dissolved in 10 parts by weight of tetrahydrofuran to provide a coating solution of the charge transport substance. Each of the resulting solutions was applied on each of the charge generating layers and then dried to provide a composite type photosensitive member for electrophotography. The electrophotographic properties of these photosensitive members are illustrated in Table 10. As can be appreciated from this table, a high sensitivity could be obtained by use of any charge transport substances of the present invention.

TABLE 10

| charge transport substance compound No. | electrophotographic properties | | | |
|---|---|---|---|---|
| | $V_0$ (V) | $V_{30}/V_0$ (%) | white light sensitivity (lux · sec) | sensitivity at 800 nm (cm²/erg) |
| 2 | 800 | 68 | 1.1 | 0.20 |
|   | 780 | 66 | 1.2 | 0.18 |
| 8 | 770 | 66 | 1.2 | 0.18 |
|   | 750 | 64 | 1.3 | 0.15 |
| 9 | 800 | 67 | 1.0 | 0.16 |
|   | 770 | 65 | 1.2 | 0.16 |
| 11 | 770 | 68 | 1.0 | 0.21 |
|    | 740 | 66 | 1.2 | 0.18 |
| 14 | 750 | 64 | 1.2 | 0.18 |
|    | 720 | 62 | 1.4 | 0.16 |
| 18 | 800 | 66 | 1.1 | 0.19 |
|    | 750 | 64 | 1.2 | 0.19 |
| 24 | 830 | 71 | 1.1 | 0.19 |
|    | 800 | 69 | 1.1 | 0.20 |

In Table 10, the properties in the upper lines designate the properties of the photosensitive member using the τ form phthalocyanine and the properties in the lower lines designate the properties of the phthosensitive member using the η form phthalocyanine.

EXAMPLE 13

| α form metal-free | |
|---|---|
| phthalocyanine | 10 parts by weight |
| milling aid | 100 parts by weight |
| solvent | 300 parts by weight |

The above three components with formulations tabulated in Table 12 were treated at a temperature of 100°±30° C. to obtain τ form metal-free phthalocyanine. Using each of the resulting τ form metal-free phthalocyanines, a charge generating layer (thickness of 1 μm) was prepared in the same way as in Example 6. The coating solution of the charge transport substance which was similar to that of Example 3 was applied on the former, providing a composite type photosensitive member for electrophotography (thickness of the charge transport layer of 10 μm). The properties of these photosensitive members are shown in Table 13. It was found that when all of the τ form metal-free phthalocyanines were used as the charge generating substance, the resulting photosensitive members had a high sensitivity in a long wavelength range of 800 nm.

TABLE 12

| Sample No. of τ-form metal-free phthalocyanine | Milling aid | Solvent | Stirrer | Time (hr) |
|---|---|---|---|---|
| 13-a | sodium sulfate | polyethylene glycol | kneader | 7–15 |
| 13-b | sodium hydrogen carbonate | polyethylene glycol:glycerol (1:1) | " | " |
| 13-c | sodium chloride | carbitol | homomixer | 8–15 |
| 13-d | " | polyethylene glycol | " | " |
| 13-e | sodium chloride | polyethylene glycol:diethylene glycol (1:1) | disperser | " |
| 13-f | " | polyethylene glycol:ethyl cellosolve (1:1) | homomixer | " |
| 13-g | nil | acetyl acetate | disperser | 50 |

TABLE 13

| Sample No. of τ-form metal-free phthalocyanine | electrophotographic properties | | | |
|---|---|---|---|---|
| | $V_0$ (V) | $V_{30}/V_0$ (%) | white light sensitivity (lux · sec) | sensitivity at 800 nm (cm²/erg) |
| 13-a | 800 | 71 | 0.9 | 0.21 |
| 13-b | 790 | 67 | 0.8 | 0.22 |
| 13-c | 770 | 69 | 0.9 | 0.21 |
| 13-d | 810 | 66 | 0.8 | 0.22 |
| 13-e | 800 | 67 | 0.9 | 0.20 |
| 13-f | 790 | 70 | 0.9 | 0.21 |
| 13-g | 800 | 72 | 1.0 | 0.20 |

As described in detail above, the composite type photosensitive member for electrophotography in accordance with the present invention exhibits an extremely high sensitivity not only to the light in the visible range but also to that in the long wavelength range of at least 790 nm which is the emitting wavelength of the semiconductor laser and can therefore be used suitably as a photosensitive member for a duplicating machine and for a semiconductor laser beam printer.

What is claimed is:

1. In a composite type photosensitive member for electrophotography in which a layer containing a charge generating substance and a layer containing a charge transport substance is disposed on a conductive substrate, the improvement wherein said charge generating substance contains at least one of a τ, τ', η or τ' form metal-free phthalocyanine pigment and said charge transport substance contains a nonionic dye base represented by the following general formula:

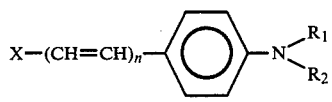

(where X is a heterocyclic group selected from

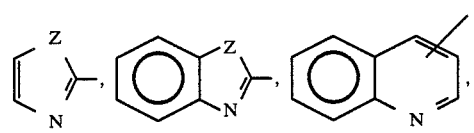

-continued

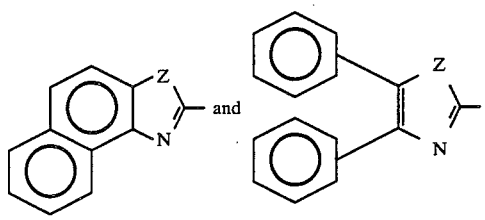

(where Z represents O or S and the heterocyclic group may be substituted), n is 0, 1 or 2 and each of $R_1$ and $R_2$ is an alkyl group of up to three carbon atoms), whereby a photosensitive member having a high sensitivity to light not only in the visible light range but also in the long wavelength range of at least 790 nm is formed.

2. A composite type photosensitive member as defined in claim 1, wherein the charge generating layer has a thickness of 20 μm or less and the charge transport layer has a thickness of 5 to 100 μm.

3. A composite type photosensitive member as defined in claim 1, wherein the charge generating layer has a thickness of 0.1 to 3 μm and the charge transport layer has a thickness of 8 to 30 μm.

4. A composite type photoconsensitive member as defined in claim 1, wherein the charge generating layer is formed on an electroconductive layer and the charge transport layer is formed on the charge generating layer.

5. A composite type photosensitive member as defined in claim 4, wherein the charge transport layer is substantially transparent to the light having a wavelength of from 500 nm to 800 nm.

6. A composite type photosensitive member as defined in claim 1, wherein the layer containing a charge generating substance is a layer of a mixture of at least one of the phthalocyanines and a resinous binder in an amount of one part by weight of the former per up to 4 part by weight of the latter.

7. A composite type photosensitive member as defined in claim 6, wherein the mixing ratio of the charge transport substance to a binder resin is one part by weight to 0.5 to 4 part by weight.

8. A composite type photosensitive member as defined in claim 6, wherein the resinous binder is a butyral resin.

9. A composite type photosensitive member as defined in claim 6, wherein the resinous binder is a saturated polyester resin.

10. A composite type photosensitive member as defined in claim 6, wherein the resinous binder is an acrylic resin.

11. A composite type photosensitive member as defined in claim 6, wherein the phthalocyanine is τ' form phthalocyanine.

12. A composite type photosensitive member as defined in claim 1, wherein the η, η', τ and τ' form metal-free phthalocyanine has infrared absorption spectra as set forth in Table 1 of the present disclosure.

13. A composite type photosensitive member as defined in claim 1, wherein said charge generating substance includes another charge generating material in addition to said at least one of a τ, τ', η or η' form metal-free phthalocyanine pigment.

14. A composite type photosensitive member as defined in claim 1, said member having a high sensitivity to light not only in the visible light range but also in the long wavelength range of 790–810 nm.

15. A composite type photosensitive member as defined in claim 1, wherein X is

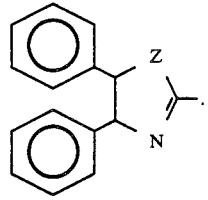

16. A composite type photosensitive member as defined in claim 1, wherein said charge generating substance is constituted by τ form metal-free phthalocyanine pigment, and X is

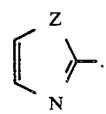

17. A composite type photosensitive member as defined in claim 1, wherein said charge generating substance contains τ form metal-free phthalocyanine pigment.

18. A composite type photosensitive member as defined in claim 17, wherein X is a heterocyclic group selected from the group consisting of

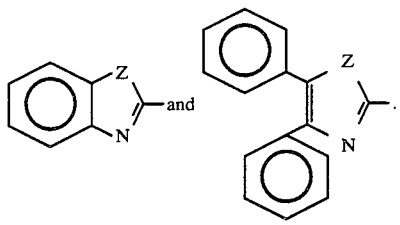

19. A composite type photosensitive member as defined in claim 18, wherein Z is O.

20. A composite type photosensitive member as defined in claim 19, wherein the heterocyclic group is substituted with a halogen.

21. A composite type photosensitive member as defined in claim 1, wherein X is a heterocyclic group selected from the group consisting of

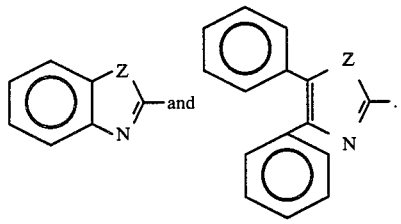

22. A composite type photosensitive member as defined in claim 21, wherein Z is O.

23. A composite type photosensitive member as defined in claim 22, wherein the heterocyclic group is substituted with a halogen.

24. A composite type photosensitive member as defined in claim 1, wherein said charge generating substance contains τ' form metal-free phthalocyanine pigment.

25. A composite type photosensitive member as defined in claim 24, wherein X is a heterocyclic group selected from the group consisting of

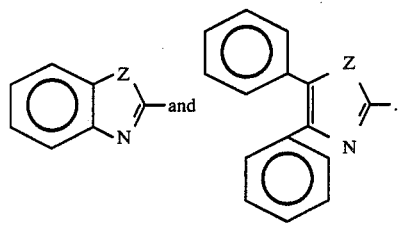

26. A composite type photosensitive member as defined in claim 25, wherein Z is O.

27. A composite type photosensitive member as defined in claim 26, wherein the heterocyclic group is substituted with a halogen.

28. A composite type photosensitive member as defined in claim 1, wherein said charge generating substance contains η form metal-free phthalocyanine pigment.

29. A composite type photosensitive member as defined in claim 28, wherein X is a heterocyclic group selected from the group consisting of

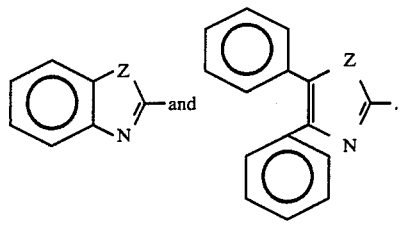

30. A composite type photosensitive member as defined in claim 29, wherein Z is O.

31. A composite type photosensitive member as defined in claim 30, wherein the heterocyclic group is substituted with a halogen.

32. A composite type photosensitive member as defined in claim 1, wherein said charge generating substance contains η' form metal-free phthalocyanine pigment.

33. A composite type photosensitive member as defined in claim 32, wherein X is a heterocyclic group selected from the group consisting of

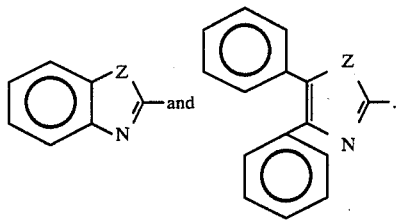

34. A composite type photosensitive member as defined in claim 33, wherein Z is O.

35. A composite type photosensitive member as defined in claim 34, wherein the heterocyclic group is substituted with a halogen.

36. A composite type photosensitive member as defined in claim 1, wherein said charge generating substance contains at least one of τ and η form metal-free phthalocyanine pigment.

37. A composite type photosensitive member as defined in claim 1, wherein said layer containing a charge transport substance has, as the sole charge transport substance, said nonionic dye base represented by said general formula.

* * * * *